United States Patent
Shavell et al.

(10) Patent No.: US 9,432,331 B1
(45) Date of Patent: Aug. 30, 2016

(54) MECHANISM FOR DISTRIBUTED RATE LIMITING

(71) Applicant: Symantec Corporation, Mountain View, CA (US)

(72) Inventors: Michael Shavell, Merrimack, NH (US); Ilya Sokolov, Boston, MA (US)

(73) Assignee: Symantec Corporation, Mountain View, CA (US)

( * ) Notice: Subject to any disclaimer, the term of this patent is extended or adjusted under 35 U.S.C. 154(b) by 0 days.

(21) Appl. No.: 14/562,247

(22) Filed: Dec. 5, 2014

(51) Int. Cl.
G06F 15/16 (2006.01)
G06F 11/00 (2006.01)
H04L 29/06 (2006.01)

(52) U.S. Cl.
CPC ........... H04L 63/02 (2013.01); H04L 63/1441 (2013.01)

(58) Field of Classification Search
CPC . H04L 63/029; H04L 63/20; H04L 63/0227; H04L 63/0236; H04L 63/145
USPC .................. 726/11, 13, 22–25; 713/152–154; 709/223–225
See application file for complete search history.

(56) References Cited

U.S. PATENT DOCUMENTS

| | | | |
|---|---|---|---|
| 6,751,668 B1* | 6/2004 | Lin | H04L 63/0227 709/225 |
| 7,234,168 B2* | 6/2007 | Gupta | G06F 21/55 705/51 |
| 7,308,716 B2* | 12/2007 | Danford | H04L 63/1458 709/224 |
| 7,523,497 B2* | 4/2009 | Cohen | H04L 47/10 370/229 |
| 7,640,591 B1* | 12/2009 | Tripathi | H04L 63/1458 726/22 |
| 2011/0197274 A1* | 8/2011 | Callon | H04L 47/10 726/22 |

* cited by examiner

Primary Examiner — Hosuk Song
(74) Attorney, Agent, or Firm — Womble Carlyle Sandridge & Rice LLP

(57) ABSTRACT

A method for distributed rate limiting is provided. The method includes detecting, in a first communication received by an application, a suspicious behavior, the first communication having traveled through a network to the application, the detecting performed by a rate limiter coupled to the application. The method includes communicating, from a blocking analytics module associated with the application, to a blocker located in the network, information regarding an origin of the first communication. The method includes blocking, at the blocker located in the network, further communication having a same origin as the origin of the first communication.

20 Claims, 4 Drawing Sheets

MECHANISM FOR DISTRIBUTED RATE LIMITING

BACKGROUND

There are two types of rate limiting available in networks and the two types are typically referred to as software-based rate limiters and hardware-based rate limiters. Software-based rate limiters can implement business logic, for example blocking communication at a server after a specified number of login attempts from the same Internet Protocol (IP) address to different accounts in the server. Rate limiting software is somewhat limited as requests still need to reach the server and still consume resources, since the request must be processed by the server before the server can block the request from proceeding to an application. Hardware-based rate limiters can only look at bandwidth. However, hardware-based rate limiters tend to be more efficient at blocking attacks as once an IP address is blocked, all incoming packets from the IP address can be ignored. Currently, software-based rate limiters operate at the application level, by tracking the IP address or some endpoint identifying signature. A software-based rate limiter is vulnerable to attack, which could bring down services or leave applications vulnerable. Since a software-based rate limiter is based in an application container, high rates of traffic can also cause service interruptions as a result of the application having to service each request and decide whether to block traffic. Under such circumstances, the application container has to handle both the usual traffic and the offending traffic.

It is within this context that the embodiments arise.

SUMMARY

In some embodiments, a method for distributed rate limiting is provided. The method includes detecting, in a first communication received by an application, a suspicious behavior, the first communication having traveled through a network to the application, the detecting performed by a rate limiter coupled to the application. The method includes communicating, from a blocking analytics module associated with the application, to a blocker located in the network, information regarding an origin of the first communication. The method includes blocking, at the blocker located in the network, further communication having a same origin as the origin of the first communication, wherein at least one action of the method is performed by a processor.

In some embodiments, a tangible, non-transitory, computer-readable media having instructions thereupon which, when executed by a processor, cause the processor to perform a method. The method includes coupling with a rate limiter of an application and coupling with a blocker in a network to which the application is coupled. The method includes cooperating with the rate limiter to determine an origin of a first communication received by the application via the network, responsive to a determination by the rate limiter that the first communication is suspicious and sending to the blocker, via the network, information about the origin of the first communication. The blocker cooperates with at least one component of the network to block further communication having a same origin as the origin of the first communication.

In some embodiments, a distributed rate limiting system is provided. The system includes a blocking analytics module, configured to couple to a software-based rate limiter of an application and couple, via a network, to a blocker located in the network. The blocking analytics module is further configured to send information regarding an origin of a first communication to the blocker, responsive to a determination made by the software-based rate limiter of suspicious behavior in the first communication. The blocker is configured to reside in a network component in the network and further configured to block at least a second communication having a same origin as the origin of the first communication, based on the information, regarding the origin of the first communication, as received from the blocking analytics module.

Other aspects and advantages of the embodiments will become apparent from the following detailed description taken in conjunction with the accompanying drawings which illustrate, by way of example, the principles of the described embodiments.

BRIEF DESCRIPTION OF THE DRAWINGS

The described embodiments and the advantages thereof may best be understood by reference to the following description taken in conjunction with the accompanying drawings. These drawings in no way limit any changes in form and detail that may be made to the described embodiments by one skilled in the art without departing from the spirit and scope of the described embodiments.

DETAILED DESCRIPTION

A distributed rate limiting system and related method are discussed herein. Various embodiments allow communication to be blocked at the infrastructure layer, by hardware-based rate limiters, based on business logic in software-based rate limiters local to applications. Blocking occurs at a higher level than the application level, in a network component such as a router, firewall or a load balancer, so the application no longer needs to service the traffic. By utilizing application-specific information, software and hardware layers are enhanced and bridged. Shared information can span multiple applications in some embodiments. Since the undesired traffic is terminated (i.e., blocked) at the network components, rate limiting can be shared among many applications in this distributed system. For example, if a single sign on (SSO) IP (Internet Protocol) rate limit requested by one server is enforced at a network appliance, the network appliance can block the same IP address destined for another server or multiple servers. This technique enhances the ability to block malicious clients and botnets.

The distributed rate limiting system described in more detail below has two major components. A first component, the blocker, is placed in one or more network components, for example within a data center (although further embodiments could be external to a data center). This configuration allows traffic to be blocked efficiently before an application container handles a connection. Information regarding the blocking can also be communicated to other network components, allowing undesired traffic to be dropped quickly, and endpoints to be blocked at scale. A second component, the blocking analytics module, is placed in the application nodes, for example in an application container or in a further component coupled to an application container. The blocking analytics module feeds information to one or more blockers, which allows tracking and blocking based on application-specific metrics such as global IP limits.

Figure 1:
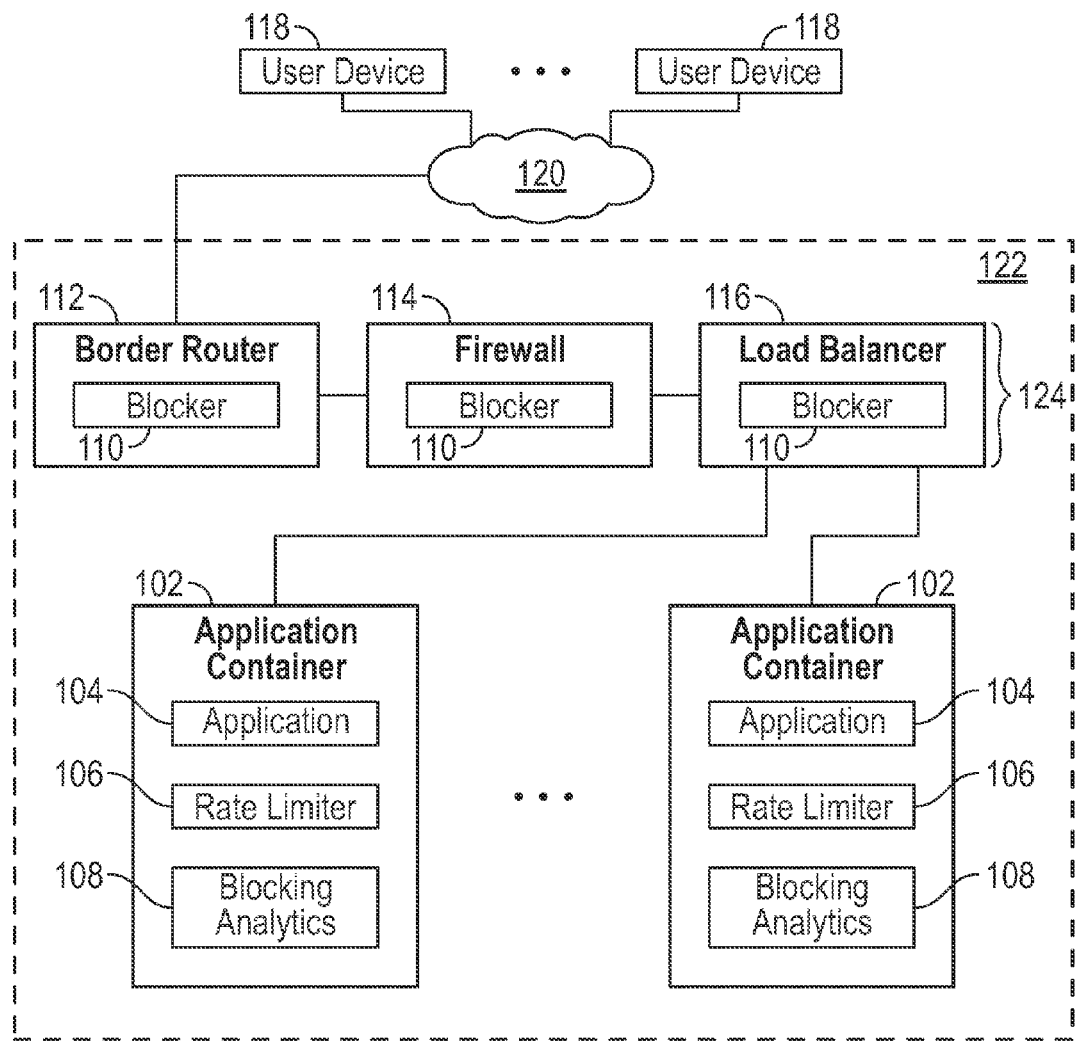
FIG. 1 is a system diagram of a distributed rate limiting system employing a blocking analytics module in one or more application containers and a blocker in one or more network components, to block communication from a particular origin in accordance with some embodiments.

FIG. 1 is a system diagram of a distributed rate limiting system employing a blocking analytics module 108 in one or more application containers 102 and a blocker 110 in one or more network components 124, to block communication from a particular origin. User devices 118 are shown communicating via a network 120, such as the global communication network known as the Internet, to applications 104 in a data center 122. The applications 104 reside in application containers 102, which could be servers or other computing devices, for example providing a web service. Generally, an application container 102 includes hardware and software associated with and supporting an application 104. Communication traffic passes from the network 120 into the data center 122, and travels through a border router 112, a firewall 114, a load balancer 116 and possibly other network components 124, in various arrangements. In this version, the load balancer 116 distributes the communication traffic to various application containers 102, each of which has one or more applications 104. In other versions, the load balancer 116 is omitted, and traffic could be routed to applications 104 through other network components 124. Variations of the above scenarios are readily devised.

In one scenario associated with the system of FIG. 1, an attacker using a user device 118 communicates with an application 104, attempting to compromise the application container 102. For example, the attacker could be trying a list of passwords, to see which password allows logging onto an account managed by an application 104. An attacker may be attempting to achieve a denial of service (DOS) attack, or applying some other hack to the application 104. A rate limiter 106 of the application 104, e.g., a software-based rate limiter associated with and in the same application container 102 as the application 104, determines that there is suspicious behavior in a communication from the user device 118 to the application 104. In a standard system, without the blocking analytics module 108 in the application container 102, and without the blocker 110 in a network component 124, the rate limiter 106 would typically prevent further communication from the user device 118 to the application 104. That is, the rate limiter 106 would be limited in influence to just protecting the application 104 to which the rate limiter 106 belongs.

In the embodiments depicted in FIG. 1, with the blocking analytics module 108 in the application container 102 (or otherwise coupled to the application 104) and with one or more blockers 110 in one or more network components 124, information regarding the origin of the suspicious communication from the user device 118 is manipulated to provide enhanced protection. The blocking analytics module 108 cooperates with the rate limiter 106 to determine the origin of the suspicious communication. For example, the rate limiter 106 could send a message regarding such an origin to the blocking analytics module 108, or the blocking analytics module 108 could monitor, poll or query the rate limiter 106. In a further embodiment, the blocking analytics module 108 and the rate limiter 106 are combined or integrated, or otherwise share functions and/or data. The blocking analytics module 108 sends information regarding the origin of the suspicious communication to a blocker 110, or to more than one blocker 110. As shown in FIG. 1, the blocker 110 could reside in or be coupled to a border router 112, a firewall 114, a load balancer 116, or another network component 124. The blocker 110 blocks further communication having the same origin as the origin of the suspicious communication.

For example, the blocker 110 could direct, instruct or otherwise cooperate with the network component 124 to block further communication with the same IP address as the suspicious communication, communication from the same subdomain as the suspicious communication, or communication from the same geographical region as the suspicious communication. Various types of blockings, couplings of the blocker 110 in the network component 124, and information used to implement a blocking of communication are readily devised in accordance with various types of network components 124 and the teachings disclosed herein. Generally, blocking entails preventing a communication from proceeding through the network component 124 to other network components 124 or to a destination.

In some embodiments of the system of FIG. 1, blockers 110 in multiple network components 124 communicate amongst themselves, sharing information about origins of suspicious communications. For example, a blocker 110 in a first network component 124 could receive information about an origin of a suspicious communication, and send such information to another blocker 110 in a second network component 124. By sharing such information, the blockers 110 cooperate with respective network components 124 to block further communications having the same origins as suspicious communications detected by individual rate limiters 106 and corresponding blocking analytics modules 108 in various application containers 102. In this manner, an entire data center 122 with multiple application containers 102 and various network components 124 can protect against various attacks from various origins. It should be appreciated that the embodiments protect against roaming attacks where a hacker targets differing applications 104 in a data center 122. In addition, while the embodiment of FIG. 1 illustrates blockers 110 within the data center 122 this is not meant to be limiting as one or more blockers 110 could be in network components 124 outside of a data center 122.

Still referring to FIG. 1, application-level processing, e.g., as performed by the rate limiter 106, and the information about an origin of a suspicious communication, could be based on IP address, username, password, an attempt count, an error count, or a success rate. Blocks based on these factors could be set and removed dynamically in some embodiments. Network infrastructure blocks which occur at the hardware level, i.e., as implemented by a network component 124 in cooperation with a blocker 110, could be temporary. This allows re-blocking based on software blocking and shared intelligence across multiple applications 104. With this level of control, fine-tuning and optimized rate limiting are possible. In some embodiments, the blockers 110 and/or the blocking analytics modules 108, singly or in cooperation, can perform a deeper inspection level across multiple services and determine to block entire subdomains or local subnets which are offenders of the system.

Figure 2:
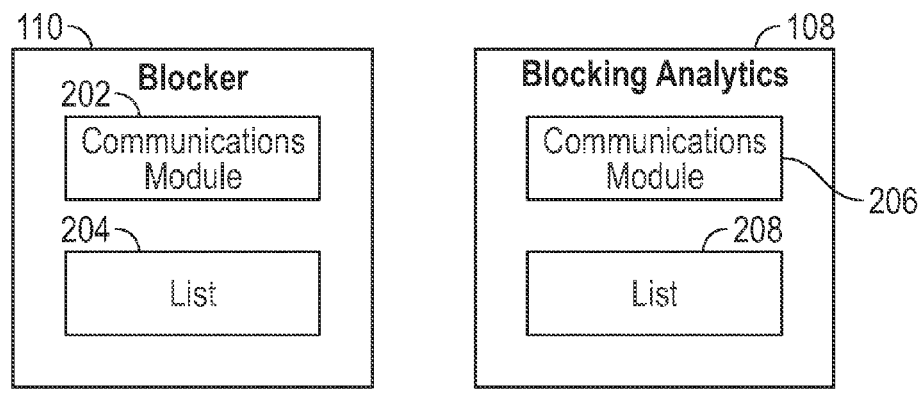
FIG. 2 is a diagram of a blocking analytics module and a blocker, from FIG. 1 in accordance with some embodiments.

FIG. 2 is a diagram illustrating further details of a blocking analytics module 108 and a blocker 110, from FIG. 1. Each of the blocking analytics module 108 and a blocker 110 can be implemented in software executing on a processor, hardware, firmware, or combinations thereof. In the embodiment shown, the blocking analytics module 108 resides in an application container 102 or in a separate component coupled to the application container 102, and includes a communications module 206 and a list 208. The communications module 206 couples the blocking analytics module 108 to a rate limiter 106 of an application 104, and couples the blocking analytics module 108 to one or more further blocking analytics modules 108 and/or one or more blockers 110 in one or more network components 124, in various embodiments. The blocking analytics module 108 adds information regarding origins of suspicious communications to the list 208, based on interactions with the rate limiter 106, and sends information from the list 208 to one or more blockers 110 and/or one or more blocking analytics modules 108, in various embodiments.

Continuing with FIG. 2, the blocker 110 resides in or is coupled to a network component 124 such as a router, a firewall or a load balancer, and includes a further communications module 202, and a further list 204. The communications module 202 couples the blocker 110 to the network component 124 and to one or more blocking analytics modules 108 and/or to one or more further blockers 110, in various embodiments. The blocker 110 adds information regarding origins of suspicious communications to the list 204, based on interactions with the blocking analytics module(s) 108 and/or the blocker(s) 110. In some embodiments, one or both lists 204, 208 are managed with a respective timer or timestamp. For example, entries on a list 204, 208 could expire after a time span or in response to other criteria, so that the blocking is not permanently applied. Lists 204 and 208 may reside within memory of the blocking analytics modules 108 and blocker 110, respectively.

Figure 3:
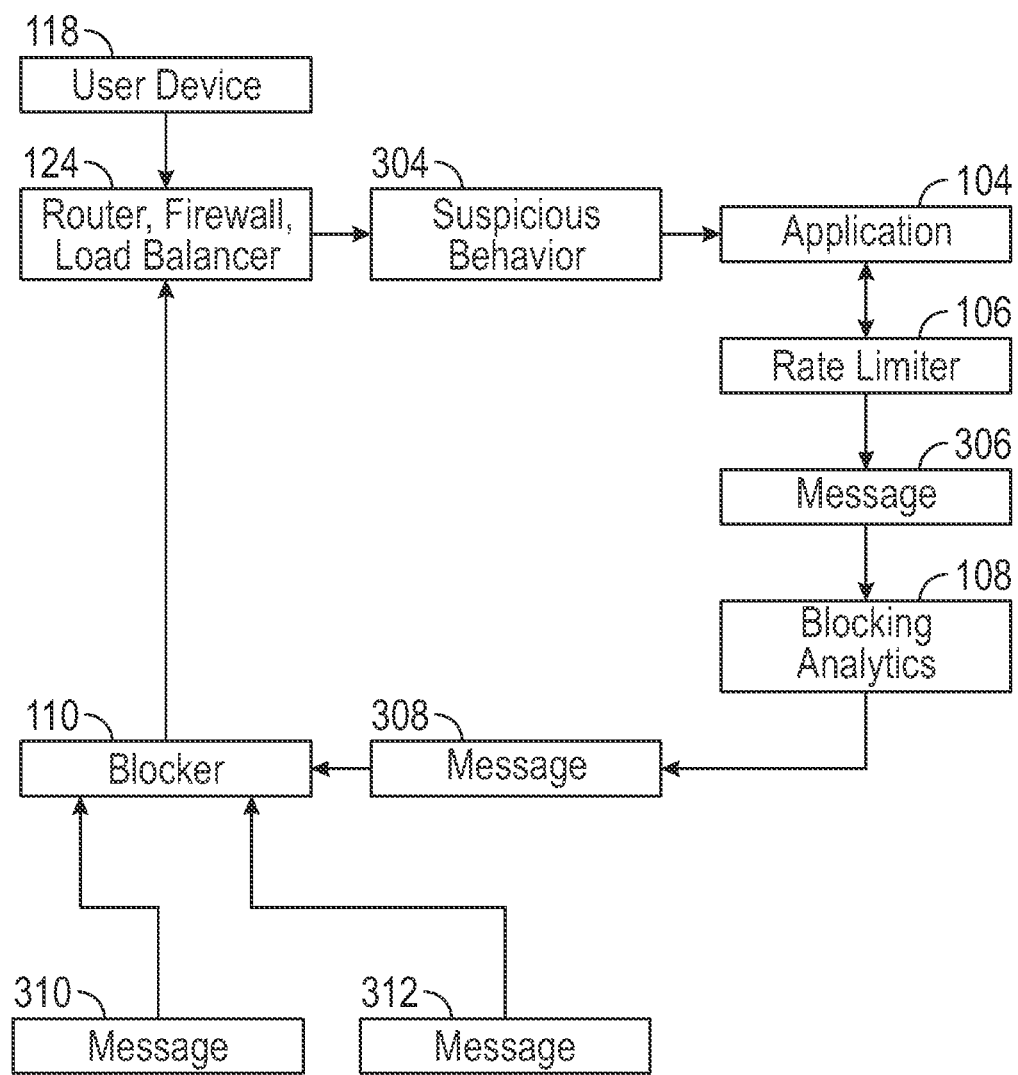
FIG. 3 is a schematic diagram illustrating suspicious behavior in a communication from a particular origin to an application, with the blocking analytics module communicating to a blocker, and the blocker directing a network component to block further communication from the same origin in accordance with some embodiments.

FIG. 3 is a schematic diagram showing suspicious behavior 304 in a communication from a particular origin to an application 104, with the blocking analytics module 108 communicating to a blocker 110, and the blocker 110 directing a network component 124 to block further communication from the same origin. FIG. 3 depicts one scenario in which the blocking analytics module 108 and the blocker 110 cooperate, and further scenarios are readily devised in accordance with the teachings herein. With reference to FIGS. 1 and 3, a user device 118 sends a communication with suspicious behavior 304 via a network to the application 104, with the communication passing through the network component 124. Suspicious behavior 304 could include, for example, multiple login attempts with differing accounts from the same origin, an attack, a defective acknowledgment, multiple synchronize requests (e.g., a SYN flood, one type of denial of service attack), an incorrect header, excess traffic from the origin, downloading an excessive amount of images, or a plurality of failed login attempts. The rate limiter 106, which is monitoring the application 104, determines that the communication has suspicious behavior 304, and sends a message 306 to the blocking analytics module 108. For example, the message 306 could include information about the origins of the communication having the suspicious behavior 304, such as an IP address, a subdomain, etc. The blocking analytics module 108 sends a message 308 to the blocker 110. This message 308 could have similar or identical information about the origins of the communication having the suspicious behavior 304, or could have information about multiple origins of multiple communications (e.g., from the list 208). The blocker 110 directs the network component 124 to block further communication from the same origin. The blocker 110 could also receive further messages 310, 312 from other blocking analytics modules 108 or from the same blocking analytics module 108, and instruct the network component 124 to perform blocking of communications having origins as specified in the messages 310, 312. In related scenarios, the blocking analytics module 108 sends the message 308, or a further message 308 to one or more further blockers 110. The blocker 110 may also send a further message 310, 312 to one or more further blockers 110.

Figure 4:
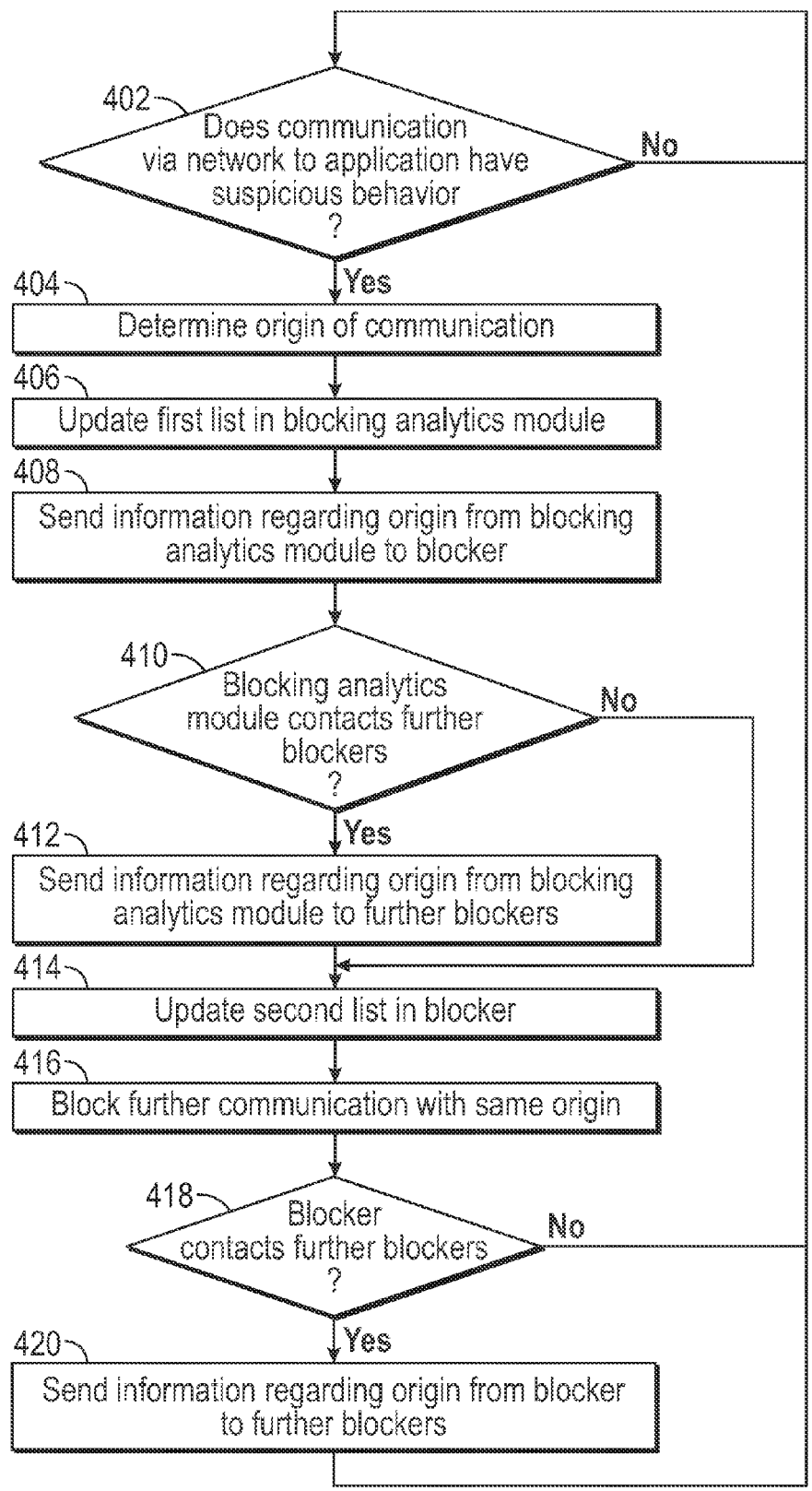
FIG. 4 is a flow diagram of a method for distributed rate limiting, which can be practiced on or by the system depicted in FIGS. 1-3 in accordance with some embodiments.

FIG. 4 is a flow diagram of a method for distributed rate limiting, which can be practiced on or by the system depicted in FIGS. 1-3. One or more processors can perform portions or all of the method, such as a processor in an application container and a processor in a network component. In a decision action 402, it is determined whether a communication via a network to an application has suspicious behavior. This determination and decision could be performed by a rate limiter of the application. If the answer is no, the flow loops back to the decision action 402, to continue monitoring communication to the application. If the answer is yes, flow proceeds to the action 404. In the action 404, the origin of the communication is determined. A first list, in a blocking analytics module, is updated. For example, the blocking analytics module could add the IP address of the communication having the suspicious behavior to the first list.

Continuing with FIG. 4, information regarding this origin is sent from the blocking analytics module to a blocker, in an action 408. For example, the blocking analytics module could send a message to the blocker, with the IP address of the suspicious communication. In a decision action 410, is determined whether the blocking analytics module should contact further blockers. This may be system dependent, with some embodiments having such contact and others not. Variations of the flow diagram of FIG. 4, omitting the action 410 and connecting the action 408 to either the action 412 or the action 414 accordingly are readily devised. If the answer in the decision action 410 is no, there should be no contact with further blockers, flow branches to the action 414. If the answer in the decision action 410 is yes, there should be contact with further blockers, flow branches to the action 412. In the action 412, information regarding the origin of the suspicious communication is sent from the blocking analytics module to further blockers.

Still referring to FIG. 4, in an action 414, a second list, stored in memory of the blocker, is updated. For example, the blocker could add the IP address of the suspicious communication to the second list, based on receiving this information as a result of the action 408. Further communication with the same origin is blocked, in an action 416. For example, the blocker could work with the network component to block communication having the same IP address as the IP address of the suspicious communication. In a decision action 418, it is determined whether the blocker should contact further blockers. This may be system dependent, with some embodiments having such contact and others not. Variations of the flow diagram of FIG. 4, omitting the action 418 and connecting the action 416 to either the action 420 or the action 402 accordingly are readily devised. If the answer in the decision action 418 is no, there should be no contact with further blockers, flow branches to the action 402. If the answer in the decision action 418 is yes, there should be contact with further blockers, flow branches to the action 420. In the action 420, information regarding the origin of the suspicious communication is sent from the blocker to further blockers. Flow then proceeds back to the action 402 and repeats as described above. In some embodiments, the blocker could receive information from one or more further blockers, and update the second list accordingly.

Figure 5:
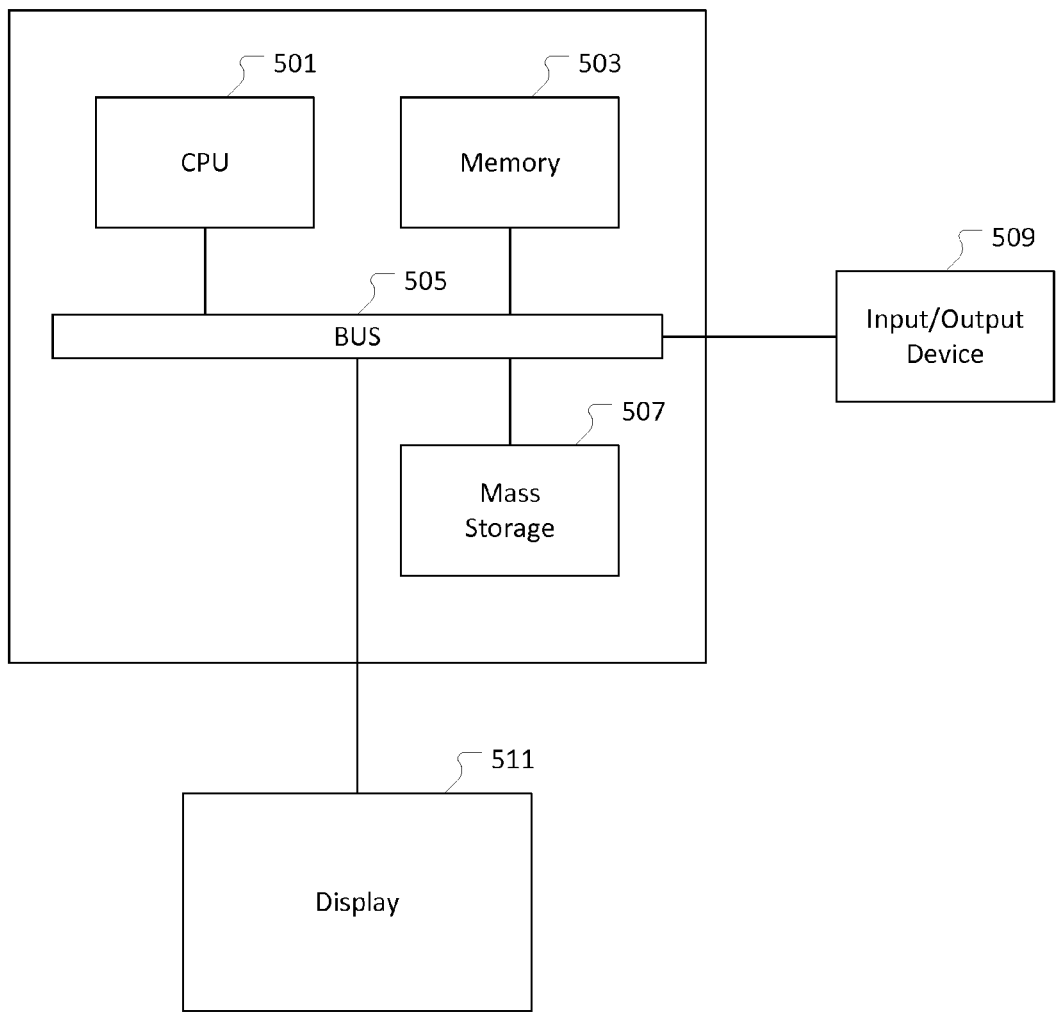
FIG. 5 is an illustration showing an exemplary computing device which may implement the embodiments described herein.

It should be appreciated that the methods described herein may be performed with a digital processing system, such as a conventional, general-purpose computer system. Special purpose computers, which are designed or programmed to perform only one function may be used in the alternative. FIG. 5 is an illustration showing an exemplary computing device which may implement the embodiments described herein. The computing device of FIG. 5 may be used to perform embodiments of the functionality for distributed rate limiting in accordance with some embodiments. The computing device includes a central processing unit (CPU) 501, which is coupled through a bus 505 to a memory 503, and mass storage device 507. Mass storage device 507 represents a persistent data storage device such as a floppy disc drive or a fixed disc drive, which may be local or remote in some embodiments. The mass storage device 507 could implement a backup storage, in some embodiments. Memory 503 may include read only memory, random access memory, etc. Applications resident on the computing device may be stored on or accessed via a computer readable medium such as memory 503 or mass storage device 507 in some embodiments. Applications may also be in the form of modulated electronic signals modulated accessed via a network modem or other network interface of the computing device. It should be appreciated that CPU 501 may be embodied in a general-purpose processor, a special purpose processor, or a specially programmed logic device in some embodiments.

Display 511 is in communication with CPU 501, memory 503, and mass storage device 507, through bus 505. Display 511 is configured to display any visualization tools or reports associated with the system described herein. Input/output device 509 is coupled to bus 505 in order to communicate information in command selections to CPU 501. It should be appreciated that data to and from external devices may be communicated through the input/output device 509. CPU 501 can be defined to execute instructions to enable the functionality described with reference to FIGS. 1-4. The code embodying this functionality may be stored within memory 503 or mass storage device 507 for execution by a processor such as CPU 501 in some embodiments. The operating system on the computing device may be MS-WINDOWS™, UNIX™, LINUX™, iOS™, or other known operating systems. It should be appreciated that the embodiments described herein may be integrated with virtualized computing system also.

Detailed illustrative embodiments are disclosed herein. However, specific functional details disclosed herein are merely representative for purposes of describing embodiments. Embodiments may, however, be embodied in many alternate forms and should not be construed as limited to only the embodiments set forth herein.

It should be understood that although the terms first, second, etc. may be used herein to describe various steps or calculations, these steps or calculations should not be limited by these terms. These terms are only used to distinguish one step or calculation from another. For example, a first calculation could be termed a second calculation, and, similarly, a second step could be termed a first step, without departing from the scope of this disclosure. As used herein, the term "and/or" and the "/" symbol includes any and all combinations of one or more of the associated listed items.

As used herein, the singular forms "a", "an" and "the" are intended to include the plural forms as well, unless the context clearly indicates otherwise. It will be further understood that the terms "comprises", "comprising", "includes", and/or "including", when used herein, specify the presence of stated features, integers, steps, operations, elements, and/or components, but do not preclude the presence or addition of one or more other features, integers, steps, operations, elements, components, and/or groups thereof. Therefore, the terminology used herein is for the purpose of describing particular embodiments only and is not intended to be limiting.

It should also be noted that in some alternative implementations, the functions/acts noted may occur out of the order noted in the figures. For example, two figures shown in succession may in fact be executed substantially concurrently or may sometimes be executed in the reverse order, depending upon the functionality/acts involved.

With the above embodiments in mind, it should be understood that the embodiments might employ various computer-implemented operations involving data stored in computer systems. These operations are those requiring physical manipulation of physical quantities. Usually, though not necessarily, these quantities take the form of electrical or magnetic signals capable of being stored, transferred, combined, compared, and otherwise manipulated. Further, the manipulations performed are often referred to in terms, such as producing, identifying, determining, or comparing. Any of the operations described herein that form part of the embodiments are useful machine operations. The embodiments also relate to a device or an apparatus for performing these operations. The apparatus can be specially constructed for the required purpose, or the apparatus can be a general-purpose computer selectively activated or configured by a computer program stored in the computer. In particular, various general-purpose machines can be used with computer programs written in accordance with the teachings herein, or it may be more convenient to construct a more specialized apparatus to perform the required operations.

A module, an application, a layer, an agent or other method-operable entity could be implemented as hardware, firmware, or a processor executing software, or combinations thereof. It should be appreciated that, where a software-based embodiment is disclosed herein, the software can be embodied in a physical machine such as a controller. For example, a controller could include a first module and a second module. A controller could be configured to perform various actions, e.g., of a method, an application, a layer or an agent.

The embodiments can also be embodied as computer readable code on a tangible non-transitory computer readable medium. The computer readable medium is any data storage device that can store data, which can be thereafter read by a computer system. Examples of the computer readable medium include hard drives, network attached storage (NAS), read-only memory, random-access memory, CD-ROMs, CD-Rs, CD-RWs, magnetic tapes, and other optical and non-optical data storage devices. The computer readable medium can also be distributed over a network coupled computer system so that the computer readable code is stored and executed in a distributed fashion. Embodiments described herein may be practiced with various computer system configurations including hand-held devices, tablets, microprocessor systems, microprocessor-based or programmable consumer electronics, minicomputers, mainframe computers and the like. The embodiments can also be practiced in distributed computing environments where tasks are performed by remote processing devices that are linked through a wire-based or wireless network.

Although the method operations were described in a specific order, it should be understood that other operations may be performed in between described operations, described operations may be adjusted so that they occur at slightly different times or the described operations may be distributed in a system which allows the occurrence of the processing operations at various intervals associated with the processing.

In various embodiments, one or more portions of the methods and mechanisms described herein may form part of a cloud-computing environment. In such embodiments, resources may be provided over the Internet as services according to one or more various models. Such models may include Infrastructure as a Service (IaaS), Platform as a Service (PaaS), and Software as a Service (SaaS). In IaaS, computer infrastructure is delivered as a service. In such a case, the computing equipment is generally owned and operated by the service provider. In the PaaS model, software tools and underlying equipment used by developers to develop software solutions may be provided as a service and hosted by the service provider. SaaS typically includes a service provider licensing software as a service on demand. The service provider may host the software, or may deploy the software to a customer for a given period of time. Numerous combinations of the above models are possible and are contemplated.

Various units, circuits, or other components may be described or claimed as "configured to" perform a task or tasks. In such contexts, the phrase "configured to" is used to connote structure by indicating that the units/circuits/components include structure (e.g., circuitry) that performs the task or tasks during operation. As such, the unit/circuit/component can be said to be configured to perform the task even when the specified unit/circuit/component is not currently operational (e.g., is not on). The units/circuits/components used with the "configured to" language include hardware—for example, circuits, memory storing program instructions executable to implement the operation, etc. Reciting that a unit/circuit/component is "configured to" perform one or more tasks is expressly intended not to invoke 35 U.S.C. 112, sixth paragraph, for that unit/circuit/component. Additionally, "configured to" can include generic structure (e.g., generic circuitry) that is manipulated by software and/or firmware (e.g., an FPGA or a general-purpose processor executing software) to operate in manner that is capable of performing the task(s) at issue. "Configured to" may also include adapting a manufacturing process (e.g., a semiconductor fabrication facility) to fabricate devices (e.g., integrated circuits) that are adapted to implement or perform one or more tasks.

The foregoing description, for the purpose of explanation, has been described with reference to specific embodiments. However, the illustrative discussions above are not intended to be exhaustive or to limit the invention to the precise forms disclosed. Many modifications and variations are possible in view of the above teachings. The embodiments were chosen and described in order to best explain the principles of the embodiments and its practical applications, to thereby enable others skilled in the art to best utilize the embodiments and various modifications as may be suited to the particular use contemplated. Accordingly, the present embodiments are to be considered as illustrative and not restrictive, and the invention is not to be limited to the details given herein, but may be modified within the scope and equivalents of the appended claims.

What is claimed is:

1. A method for distributed rate limiting, comprising:
    detecting, in a first communication received by an application, a suspicious behavior, the first communication having traveled through a network to the application, the detecting performed by a rate limiter coupled to the application;
    communicating, from a blocking analytics module associated with the application, to a blocker located in the network, information regarding an origin of the first communication;
    blocking, at the blocker located in the network, further communication having a same origin as the origin of the first communication;
    maintaining, in the blocker, a list of a plurality of origins of suspicious communications, which includes the origin of the first communication, based on information from a plurality of blocking analytics modules associated with a plurality of applications; and
    blocking, at the blocker located in the network, further communication having origins same as the plurality of origins of suspicious communications, wherein at least one action of the method is performed by a processor.

2. The method of claim 1, wherein the same origin as the origin of the first communication includes one of an IP (Internet Protocol) address, a subdomain, or a geographical location.

3. The method of claim 1, wherein the blocker located in the network is in one of a router, a firewall, or a load balancer.

4. The method of claim 1, wherein the detecting the suspicious behavior in the first communication includes detecting one of a plurality of login attempts with differing accounts from the same origin, an attack, a defective acknowledgment, a plurality of synchronize requests, an incorrect header, excess traffic from the origin, downloading an excessive amount of images, or a plurality of failed login attempts.

5. The method of claim 1, wherein the detecting the suspicious behavior in the first communication is based on one of an IP address, a username, a password, an attempt count, an error, or a success rate.

6. The method of claim 1, wherein blocking further communication having a same origin as the origin of the first communication includes blocking one of an IP address, a subdomain, or a subnet.

7. The method of claim 1, wherein the blocker is located in a load balancer.

8. The method of claim 1, wherein the rate limiter coupled to the application is a software-based rate limiter in a same container as the application.

9. A tangible, non-transitory, computer-readable media having instructions thereupon which, when executed by a processor, cause the processor to perform a method comprising:
    coupling with a rate limiter of an application;
    coupling with a blocker in a network to which the application is coupled;
    cooperating with the rate limiter to determine an origin of a first communication received by the application via the network, responsive to a determination by the rate limiter that the first communication is suspicious; and
    sending to the blocker, via the network, information about the origin of the first communication, wherein the blocker maintains a list of a plurality of origins of suspicious communications, including the origin of the first communication, based on information from a plurality of blocking analytics modules associated with a plurality of applications and wherein the blocker cooperates with at least one component of the network to block further communication having a same origin as on the list of the plurality of origins of suspicious communications.

10. The computer-readable media of claim 9, wherein the information about the origin of the first communication includes one of an IP (Internet Protocol) address, a subdomain, or a geographical location.

11. The computer-readable media of claim 9, wherein the blocker is located in or coupled to one of a router, a firewall, or a load balancer.

12. The computer-readable media of claim 9, wherein the application, the rate limiter of the application and the processor that performs the method are included in an application container.

13. The computer-readable media of claim 9, wherein a network component having the blocker, and an application container having the application and the rate limiter, are in a data center.

14. The computer-readable media of claim 9, wherein the method further comprises:
sending the information about the origin of the first communication to a further blocker in a further component of the network.

15. A distributed rate limiting system, comprising:
a computing device, comprising hardware;
a blocking analytics module in the computing device, configured to couple to a software-based rate limiter of an application and couple, via a network, to a blocker located in the network, the blocking analytics module further configured to send information regarding an origin of a first communication to the blocker, responsive to a determination made by the software-based rate limiter of suspicious behavior in the first communication;
the blocker, configured to reside in a network component in the network and further configured to block at least a second communication having a same origin as the origin of the first communication, based on the information, regarding the origin of the first communication, as received from the blocking analytics module;
the blocker having a communications module configured to communicate with a plurality of blocking analytics modules, each of the plurality of blocking analytics modules associated with a further application; and
the blocker configured to maintain a list of origins of suspicious communications, based on information from the plurality of blocking analytics modules, and configured to block further communication having same origins as the origins of the suspicious communications.

16. The distributed rate limiting system of claim 15, further comprising:
an application container, hosting the application, the software-based rate limiter of the application, and the blocking analytics module, wherein the application container and the network component in which the blocker resides are in a data center.

17. The distributed rate limiting system of claim 15, further comprising:
the blocking analytics module having a communications module configured to send the information regarding the origin of the first communication to the blocker and to a further blocker residing in a further network component in the network.

18. The distributed rate limiting system of claim 15, further comprising:
a plurality of blockers, including the blocker; and
a plurality of blocking analytics modules, including the blocking analytics module, the plurality of blockers and the plurality of blocking analytics modules configured to cooperate to share information regarding origins of suspicious communications, as detected by the plurality of blocking analytics modules, so that the plurality of blockers can block further communication having same origins as the origins of the suspicious communications.

19. The distributed rate limiting system of claim 15, wherein the network component includes one of a router, a border router, a firewall, or a load balancer.

20. The distributed rate limiting system of claim 15, wherein the blocking analytics module resides in one of an application container hosting the application and the software-based rate limiter of the application, or a component distinct from the application container and coupled to the application container.

* * * * *